Patented Apr. 10, 1945

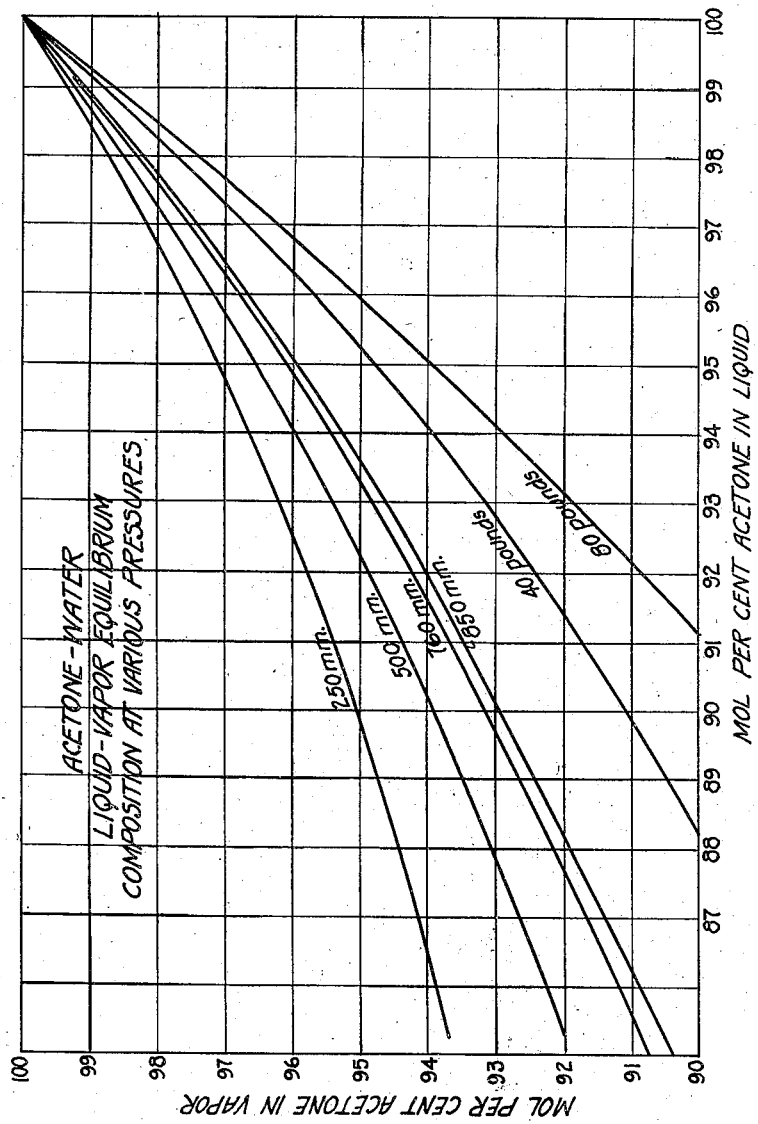

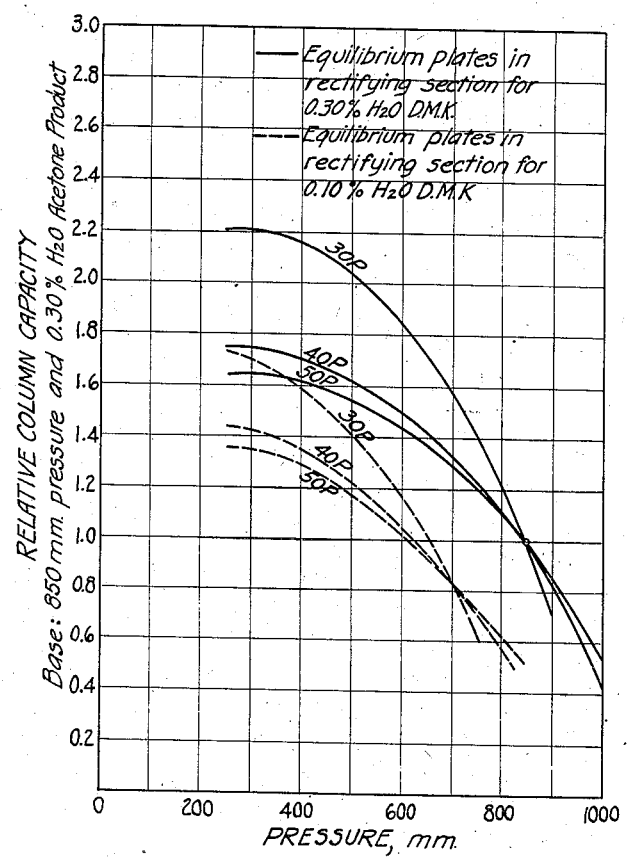

2,373,269

UNITED STATES PATENT OFFICE 2,373,269

DEHYDRATION OF ACETONE

Russell N. Shiras, Oakland, and David B. Luckenbill, Berkeley, Calif., assignors to Shell Development Company, San Francisco, Calif., a corporation of Delaware Application May 26, 1942, Serial No. 444,606

5 Claims. (Cl. 202—52)

This invention relates to the preparation of anhydrous acetone and more particularly pertains to improvements in the dehydration of acetone by fractional distillation.

Acetone may be produced by any one of several methods. In most cases, regardless of the process used for its preparation, crude acetone contains a substantial amount of water. For example, in the manufacture of acetone from isopropyl alcohol by catalytic oxidation or dehydrogenation of isopropyl alcohol, it is common practice to quench the gaseous mixture issuing from the reaction tube or chamber with water to separate the carbon monoxide and hydrocarbon gases produced as a result of the reaction, the acetone and unconverted alcohol together with a relatively small proportion of impurities, mostly of an aldehydic character, being taken up by the quenching water.

As there are a number of uses for acetone wherein material which is substantially completely anhydrous is required (0.20 per cent water or less), it is important that a high degree of separation of the water present in the crude acetone product be attained. Among the many applications for acetone wherein a substantially completely anhydrous material is essential, or at least highly advantageous, may be mentioned its use as a solvent for commercial coating materials, particularly nitro-cellulose, cellulose acetate, cellulose acetobutyrate, cellulose acetopropionate, ethyl cellulose and the like, and, in the manufacture of smokeless powder, for the gelatinization of nitro-cellulose. An anhydrous acetone is also advantageous in the production of artificial filaments and hypersensitive photographic films.

In the dehydration of aqueous acetone by fractionation, the distillation is usually carried out in a continuous manner, the aqueous acetone being continuously introduced into the distillation column at the desired rate, while at the same time a definite portion of the overhead is collected as finished material, the remainder being employed as reflux. Since maximum column capacity is, in general, realized by operation at atmospheric pressure or at pressures somewhat in excess of atmospheric pressure, it has been the practice in the dehydration of aqueous acetone by fractional distillation to operate at such pressures. However, the dehydration of acetone to less than 0.30% water by distillation at atmospheric or superatmospheric pressures is difficult and uneconomical. A high column of large diameter is required and the fuel and cooling water consumption is excessively high, since the product must be distilled overhead at high reflux. The operation, moreover, by reason of the high reflux rates necessary, is extremely time consuming, frequently requiring the devotion of a large portion of the finishing equipment of the individual plant for long periods and often constituting a production "bottle neck."

It is an object of the present invention to provide a practical and economical method for effecting the substantially complete dehydration of acetone by fractional distillation without the use of auxiliary water-removing materials. Another and more particular object is to provide improvements in the dehydration of acetone by fractional distillation whereby column production capacity is increased, or which may be conversely applied to reduce column requirements. A still further object of the invention is to produce an anhydrous or substantially anhydrous acetone more economically than is practically possible according to heretofore employed methods for separating water and acetone by fractional distillation.

In the separation of one or more components of a mixture by fractional distillation, decreased column production capacity is normally expected from reduction of pressure by reason of the resulting increase in vapor volume, generally necessitating a slower feed rate to prevent entrainment of liquid in vapor and consequent flooding of the column. However, it has now been found with respect to the fractionation of acetone from mixtures thereof with water that, contrary to the general rule, column capacity is not reduced but is materially increased by operation at pressures below atmospheric pressure, and further that for the maximum effect greatly reduced operating pressures are unnecessary, an easily attained and maintained subatmospheric pressure in the order of 200 to 400 mm. being sufficient. According to the process of the invention, column production capacity may, in many instances, be increased 40 to 80% and the acetone product materially improved as to the water content or, alternatively, as will be pointed out hereinafter with greater particularity, column capacity may be more than doubled without increasing the water content of the finished product.

The process is illustrated by reference to the accompanying drawings of which Figure I sets out equilibrium data obtained by the distillation of acetone-water mixtures at various pressures and of which Figure II graphically illustrates the superiority of the present process in terms of column production capacity relative to operation according to previously employed methods, the data represented covering columns of 30, 40 and 50 equilibrium rectifying plates.

The present process for dehydrating acetone by fractional distillation is predicated upon the discovery that the volatility of acetone relative to water increases markedly as the pressure over the mixture is decreased from 80 p. s. i. to 250 mm. (4.82 p. s. i.) as shown graphically by Figure I. Figure I shows that when the liquid in contact with the equilibrium vapor is concentrated in acetone to the extent of 97 mol per cent the equilibrium vapor at 850 mm. pressure contains only 97.44 mol per cent acetone, giving a volatility ratio between the two compounds of only about 1.18 at this pressure. Thus the difficulties heretofore experienced in producing an acetone of low water content by operation at pressures in excess of atmospheric pressure whereby it was thought to achieve maximum column production capacity are readily understood. Figure I further shows that when the pressure over the liquid containing 97 mol per cent acetone is 250 mm. the equilibrium vapor contains 98.7 mol per cent acetone. This gives a volatility ratio between the two compounds at this pressure of, roughly, 1⅔, which permits of a much higher degree of separation than is possible at 850 mm., and with equipment of only moderate size and heat requirements. Because of the increase in the relative volatility of acetone and water resulting from operation at reduced pressures, according to the process of the invention, the amount of reflux necessary to attain a given product purity is much less than the amount required to attain the same purity by operation at superatmospheric pressures. It is, as a matter of fact, by reducing reflux requirements that the instant process increases column production capacity. The amount of increase in production capacity achieved with respect to a given column depends, of course, upon whether or not it is also desired to increase product purity, that is, decrease the relative amount of water present in the finished acetone.

The practical significance of the present process in terms of its effect upon column production capacity and product purity is best shown by the graph of Figure II developed from McCabe and Thiele diagrams based on the experimental data and applying to any acetone-water mixture containing 30 to 70 weight per cent acetone. As shown on Figure II, the reference point for the capacity calculations is the column capacity at 850 mm., the heretofore most customarily employed operating pressure, with reflux sufficient to reduce the water content of the acetone to 0.3 weight per cent with the specified member of equilibrium rectifying plates. From Figure II it is apparent that from the standpoint of production capacity the optimum operating pressure for the separation of acetone and water is within the range 200 to 400 mm. Since the condensation temperatures of acetone at 200 and 400 mm. pressure are 21.6° C. (68° F.) and 38.3° C. (101° F.) respectively, some means of artificial cooling such as ammonia or sulfur dioxide may be necessary to condense the product at these pressures, but at 500 mm. pressure, at which pressure column capacity is increased only to a slightly lesser extent, ordinary plant cooling water suffices. Thus, assuming a forty plate finishing column operating at approximately 850 mm. top pressure with a plate efficiency of 75% to produce an acetone product containing 0.3% water, by means of ordinary plant cooling water alone the capacity or throughput of the column can be doubled with an 0.30% water control or, alternatively, the producing capacity of the column may be increased to 40% and a product containing only 0.10% water obtained.

In executing the present process, which may be accomplished by operating either batchwise or continuously, the desired subatmospheric pressure may be obtained in any suitable manner, for example, by means of a steam ejector or vacuum pump acting upon the product accumulator in communication with the condenser, allowance being made for pressure drop between these two units.

The reflux rate employed is naturally determined by the extent of dehydration required and the number of plates in the available column as well as the exact operating pressure employed. In general, it is preferred to operate with columns of from 20 to 60 total plates, the feed material being directed to enter upon the sixth to the fifteenth plate. For a given column, operated according to the teachings of the present invention to produce an acetone containing, for example, 0.20% water, the reflux rate is, of course, much lower than if the same column should be operated at higher pressures, if it could be so operated to give a product of this water content, because, as has been previously stated, it is actually by reducing the amount of reflux required that the instant process increases throughput.

The process of the invention, which has been particularly described as applied to increasing the production capacity of an acetone finishing column and/or to decrease the water content of the acetone product, may also be applied to reduce column requirements, that is, according to the process of the invention, columns of smaller diameter and/or containing fewer plates may be employed to accomplish the desired result. For example, at the heretofore customary operating pressure of 850 mm. a column of 40 to 45 total plates operated at a reflux ratio of 5 is necessary to obtain acetone having a water content of 0.30% while the same product purity may be achieved by the present process, and without the employment of any condensing agent other than water, with a column of not more than 20 total plates, operated at the same reflux ratio. Furthermore, while a column of at least 45 to 50 plates operated at a reflux ratio of at least 10 and at a pressure of 850 mm. is necessary to yield an acetone product containing not more than 0.10% water, the process of the invention can be advantageously operated with a column of less than 20 total plates, employing a reflux ratio of only 3 to 5 and an operating pressure in the range of from 200 to 400 mm. to obtain acetone of the same low water content (not more than about 0.1%).

It is to be understood that the process of the invention is broadly applicable to the separation of water from mixtures containing acetone and water, irrespective of their source, and that the mixture distilled may or may not contain other components. The treated mixture may predominate in acetone or it may predominate in water or in components other than water or acetone.

Mixtures may be subjected to the process which contain as little as, for example, 1% either of water or acetone. Excellent results have been achieved with respect to mixtures containing 50 to 99% acetone. When the process is applied to the dehydration of the crude acetone product obtained by the water quenching of the reaction mixture resulting from the oxidation or dehydrogenation of isopropyl alcohol, prior removal of water-insoluble and high boiling impurities by suitable means is preferred. In the execution of the process, the finished anhydrous acetone is obtained as the distillate. The residue, consisting in the main of unconverted alcohol and water, may be thereafter separated into its components and, if desired, the alcohol may be returned as feed to the reactor.

The following example is introduced to illustrate one method of executing the process of the invention. The example is not to be construed as limitative with regard to the material treated and the procedure employed.

*Example*

An aqueous acetone mixture containing acetone and water in the weight ratio of about 2 to 1 was continuously distilled in a fractionating column provided with 49 plates. The pressure (absolute) in the column was about 300 mm. When the reflux ratio (ratio of reflux to distillate) was 1, the acetone product contained about 0.38 weight per cent water. Increasing the reflux ratio to 2 resulted in an acetone containing only about 0.14 weight per cent water. A still greater increase of the reflux ratio to 3 gave an acetone containing only about 0.04% water.

The same material was distilled in the same apparatus, the pressure in the column being maintained at about 500 mm. (absolute). Reflux ratios of 2, 3 and 4 resulted in an acetone distillate containing, respectively, 0.32%, 0.18% and 0.09% by weight of water.

When the same material was distilled in the same apparatus, the pressure in the column being atmospheric, a reflux ratio of 3 was necessary to obtain an acetone distillate containing 0.52% water. When the reflux ratio was increased to 5, the acetone distillate still contained about 0.39% water.

In each of the foregoing distillations the aqueous acetone mixture was introduced into the column at the fifteenth plate.

The fractionation of the same aqueous acetone mixture was effected while maintaining a pressure of about 850 mm. (absolute) in the fractionation column. To obtain an acetone distillate containing about 0.32% water, it was necessary to employ a column containing 80 plates and operate with a reflux ratio of 5. During this distillation the mixture was fed to the twelfth plate.

We claim as our invention:

1. A process for the production of substantially anhydrous acetone from a mixture containing acetone and water which comprises subjecting the acetone-water mixture to a fractional distillation in a fractionating zone maintained at a pressure between about 200 millimeters and 400 millimeters (absolute), and separating substantially anhydrous acetone from the fractionating zone.

2. A process for the production of substantially anhydrous acetone from a mixture essentially comprising acetone and water, which mixture contains from about 1% to about 50% by weight of water based on the acetone, which comprises subjecting said acetone-water mixture to a fractional distillation in a fractionating zone maintained at a pressure of between about 200 mm. and 400 mm. (absolute), and separating substantially anhydrous acetone from the fractionating zone.

3. In a process for the production of substantially anhydrous acetone from a mixture containing acetone and water, the steps of introducing the acetone-water mixture into a distillation column maintained at a temperature sufficient to effect the vaporization of acetone but insufficient to vaporize any major amount of water, withdrawing substantially anhydrous acetone from the upper part of the distilling column, condensing at least a portion of said vapors, returning at least a part of said condensate to said column as reflux, and maintaining said distillation column at a pressure of between about 200 mm. and about 400 mm. (absolute), thereby increasing the relative column capacity and the degree of dehydration as compared to the results obtained when the distillation is effected under the same conditions but at higher pressures.

4. In a process for the production of substantially anhydrous acetone from a mixture containing acetone and water, the steps of introducing the acetone-water mixture into an intermediate point of a distillation column maintained at a pressure of between about 200 mm. and about 500 mm. (absolute) and at a temperature sufficient to vaporize the acetone, withdrawing substantially anhydrous acetone vapors from the upper part of the distilling column, condensing at least a portion of said vapors, and returning at least a part of said condensate to said column as reflux.

5. In a process for the production of substantially anhydrous acetone from a mixture containing acetone and water, the steps of introducing the acetone-water mixture into an intermediate point of a distillation column maintained at a substantial subatmospheric pressure of about 500 mm. (absolute) and at a temperature sufficient to vaporize the acetone, withdrawing substantially anhydrous acetone vapors from the upper part of the distilling column, condensing at least a portion of said vapors, and returning at least a part of said condensate to said column as reflux.

RUSSELL N. SHIRAS.
DAVID B. LUCKENBILL.